United States Patent

Kaminski et al.

[11] Patent Number: 5,919,837
[45] Date of Patent: *Jul. 6, 1999

[54] FRICTION MATERIALS CONTAINING BLENDS OF ORGANIC FIBROUS AND PARTICULATE COMPONENTS

[75] Inventors: Stanley Sigmund Kaminski, Stamford; Robert Ellsworth Evans, Huntington, both of Conn.

[73] Assignee: Sterling Chemicals International, Inc., Houston, Tex.

[ * ] Notice: This patent is subject to a terminal disclaimer.

[21] Appl. No.: 08/877,696

[22] Filed: Jun. 17, 1997

Related U.S. Application Data

[63] Continuation of application No. 08/287,751, Aug. 9, 1994, abandoned.

[51] Int. Cl.[6] .................................................... C08J 5/14
[52] U.S. Cl. ........................ 523/156; 523/149; 523/152; 523/157; 523/158; 525/142; 525/180; 525/238
[58] Field of Search .................................. 523/149, 152, 523/153, 154, 156, 155, 157, 158, 222; 525/238, 180, 142

[56] References Cited

U.S. PATENT DOCUMENTS

| | | | |
|---|---|---|---|
| 2,691,645 | 1/1954 | Sochalski | 260/38 |
| 2,963,457 | 12/1960 | Miller | 260/29.6 |
| 2,983,718 | 5/1961 | Wishwam et al. | 260/80.5 |
| 3,325,345 | 6/1967 | Hider | 162/169 |
| 4,145,223 | 3/1979 | Iwata | 106/36 |
| 4,197,223 | 4/1980 | Bartraw | 260/17.2 |
| 4,274,914 | 6/1981 | Keith et al. | 162/109 |
| 4,324,706 | 4/1982 | Tabe et al. | 523/149 |
| 4,374,211 | 2/1983 | Gallagher et al. | 523/156 |
| 4,384,640 | 5/1983 | Trainor et al. | 192/107 M |
| 4,387,178 | 6/1983 | Tracy et al. | 524/448 |
| 4,418,115 | 11/1983 | Le Lannou | 428/283 |
| 4,485,138 | 11/1984 | Yamamoto et al. | 428/131 |
| 4,495,030 | 1/1985 | Giglia | 162/145 |
| 4,508,855 | 4/1985 | Peters | 523/153 |
| 4,539,240 | 9/1985 | Wargin | 428/64 |
| 4,656,203 | 4/1987 | Parker | 523/155 |
| 4,748,075 | 5/1988 | Beyer et al. | 428/221 |
| 4,769,274 | 9/1988 | Tellvik et al. | 428/218 |
| 4,811,908 | 3/1989 | Galati | 241/21 |
| 4,866,107 | 9/1989 | Doxsee et al. | 523/153 |
| 5,004,497 | 4/1991 | Shibata et al. | 75/229 |
| 5,106,887 | 4/1992 | Horiguchi | 523/155 |
| 5,190,657 | 3/1993 | Heagle et al. | 210/645 |
| 5,272,198 | 12/1993 | Kaminski et al. | 524/426 |
| 5,362,562 | 11/1994 | Evans et al. | 428/369 |

FOREIGN PATENT DOCUMENTS

| | | |
|---|---|---|
| A-264 096 | 4/1988 | European Pat. Off. . |
| 0282 004 | 9/1988 | European Pat. Off. . |
| A-352 363 | 1/1990 | European Pat. Off. . |
| A-444 473 | 9/1991 | European Pat. Off. . |
| A-510 257 | 10/1992 | European Pat. Off. . |
| A-511838 | 11/1992 | European Pat. Off. . |
| A-557 905 | 9/1993 | European Pat. Off. . |
| A-616003 | 9/1994 | European Pat. Off. . |
| A-647 793 | 4/1995 | European Pat. Off. . |
| A-2 507 123 | 12/1982 | France . |
| A-37 35 634 | 5/1989 | Germany . |
| 87/106133 | 5/1987 | Japan . |
| 87/149908 | 7/1987 | Japan . |
| 866445 | 4/1961 | United Kingdom . |
| 2027724 | 2/1980 | United Kingdom . |
| 1604827 | 12/1981 | United Kingdom . |
| 2129006 | 2/1987 | United Kingdom . |
| A-224 285 | 5/1990 | United Kingdom . |
| WO-A-9218578 | 10/1992 | WIPO . |
| 9304300 | 3/1993 | WIPO . |
| 93/04300 | 4/1993 | WIPO . |

*Primary Examiner*—James J. Seidleck
*Assistant Examiner*—U. K. Rajguru
*Attorney, Agent, or Firm*—Tobor & Goldstein, L.L.P.

[57] ABSTRACT

Wet processed friction materials are disclosed wherein the components thereof include blends of a) fibrillated, organic, synthetic polymer, b) organic, synthetic polymer staple and c) organic, synthetic soluble polymer particles.

14 Claims, No Drawings

FRICTION MATERIALS CONTAINING BLENDS OF ORGANIC FIBROUS AND PARTICULATE COMPONENTS

This application is a continuation of application Ser. No. 08/287,751, filed Aug. 9, 1994, now abandoned.

BACKGROUND OF THE INVENTION

This invention relates to a blend of a) fibrillated, organic, synthetic polymer, b) synthetic, organic polymer fiber staple and c) synthetic, organic, soluble polymer particles and its incorporation into wet mix non-asbestos type friction materials for the purpose of improving their processability, green strength and in many cases, improving the physical properties of the resultant cured friction material. Wet mix roll linings are often produced by shaping small modules of stock in wheel-rolling machine. The machine consists of two wheels rotating slowly in opposite directions, The upper wheel rotates as a close fit between flanges on the lower wheel and the distance between the flanges determines the width of the liner while the spacing between the wheels determines its thickness. Dough from a mixer is broken down into small granules and passed through the nip of the wheels. The dough is shaped and pressed in the proper density and the resultant continuous ribbon of dough is then cut into strips of the required length for processing into brake linings, disk pads, truck block, off highway brakes, clutch facings and the like. Solvent is used in the stock to dilute the resin binder in order to expedite the wetting of the dry components. After forming the linings, the bulk of the solvent is removed by drying. Any remaining solvent is removed during the early stages of the step-cure. As is well recognized, it has become incumbent upon the industry to find a cost-effective replacement for asbestos in friction materials because of the health, environmental and safety hazards attributed to asbestos. Numerous approaches to the replacement of asbestos have led to a substantial body of technology and prior art that has resulted in at least two major categories of non-asbestos formulations. They are: 1) semi-metallic materials, and 2) organic non-asbestos materials. These materials are more fully discussed in U.S. Pat. No. 4,866,107, hereby incorporated herein by reference.

The elimination of asbestos from friction material formulations, although relatively successful, has caused, however, various other problems not the least of which is difficult processing blends of ingredients for the manufacture of linings, the reduced strength and toughness of linings produced from other ingredients, the increased cost of said ingredients vis-a-vis asbestos and the physical and frictional performance of said finished products compared to asbestos-containing materials. Additionally, many of the asbestos replacement type formulations for friction materials have failed to achieve success due to reduced frictional/thermal stability properties of the molded friction material which render them less competitive.

Most attempts to eliminate asbestos fibers from friction material formulations have centered around the use of other organic and inorganic fibrous materials, alone or in conjunction with a myriad of different components.

For example, U.S. Pat. No. 4,145,223 incorporates glass fibers and ceramic fibers whereas U.K. Published Application No. 2027724A employs preoxidized acrylic fibers. Similarly, U.S. Pat. No. 4,197,223 and U.K. Patent No. 1604827 teach mixtures of inorganic and organic fibers such as glass fibers, mineral wools, alumina-silicate fibers, wood pulp, jute, sisal and cotton linters. Ararnid fibers are taught in U.S. Pat. Nos. 4,374,211 and 4,384,640 and acrylic fibers are shown in U.S. Pat. Nos. 4,418,115; 4,508,855; 4,539,240 and 4,656,203; G.B. Published Application No. 2,129,006A and Japanese Published Application Nos. 87/106,133; 87/89, 784 and 87/149,908.

Additionally, in U.S. Pat. No. 4,324,706 there is disclosed the combination of pulp-like particles of heat-resistant aromatic polymeric materials, inorganic or organic fibrous materials, friction-regulating agents and thermosetting polymer binders.

U.S. Pat. No. 4,866,107 claims a composition of a thermosetting binder resin, a fibrous reinforcing material and a fibrillated acrylonitrile polymer-based fiber of an Efficiency Index from about 0.8 to about 2.0.

European Published Patent Application No. 0,282,004 discloses a reinforcing mixture for friction products employing a polyacrylonitrile wet gel containing an additive comprising polyethylene glycol esters of pelargonic acid, enanthic acid, caprylic acid, capric acid and blends thereof etc.

Recently issued U.S. Pat. No. 5,106,887 teaches the formation of non-asbestos friction materials comprising fibrillated acrylic fibers admixed with glass fibers, heat resistant organic fibers, inorganic fibers or metallic fibers wherein the fibrillated acrylic fibers have a CANADIAN STANDARD FREENESS (CSF) of at least 450 ml whereas U.S. Pat. No. 5,004,497 claims a friction material comprising 0.85–30%, by weight, of carbon fibers and 2–20%, by weight, of aramid fibrillated and chopped fibers. The material may contain 3–20%, by weight, of polyimide dust, melamine dust, cashew dust or phenol dust. These dusts are cured, thermoset materials and not soluble and therefore do not fall within the scope of the present invention. The '887 patent does not mention the inclusion of organic, synthetic polymer particles and, in fact, specifically discloses that the organic fibers are aramid pulp, a fibrillated fiber. No organic, synthetic polymer particles are mentioned.

Moreover, PCT Published Application No. WO93/04300 teaches the production of a composite friction material comprising a matrix resin, a fiber reinforcing material and aramid particles. The fibrous reinforcing material may be pulp or floc, but not both.

All of the above cited references fail to recognize the unique cooperative effect which is achieved by employing the unique blend of the present invention. The references either fail to teach the use of particles of synthetic, soluble organic polymer or, if such particles are suggested, fail to include one or both of the other critical components of the present invention. More specifically, U.S. Pat. No. 4,324,706 teaches pulp-like particles such as fibers, films, flakes or ribbons each provided with a plurality of tentacle-like projections in combination with staple fibers. No polymer particles having diameters of less than 60 microns are disclosed in the '706 patent, the particles of this reference being more akin to fibrillated fiber component a) hereof than the particles c).

U.S. Pat. No. 4,866,107 teaches a blend of a fibrillated fiber and other organic, synthetic polymer fibers but does not mention that said other fibers are staple or that particles of organic, synthetic polymer must be employed therewith.

The WO93/04300 published application is probably the closest prior art as relates to the instant invention. The '300 application utilizes aramid particles as wear additives in the formation of friction materials in conjunction with fibers in the form of floc or pulp. The floc is described as fibers cut to lengths of 1–10 mm whereas the pulp is described as fibrillated fibers. Both the pulp or floc are preferably composed of aramid-type polymers. The aramid particles range from 10–250 microns in size, the smallest being described as providing processing assistance by aiding the opening of the fibrillated fiber during mixing but the application does not discuss wet mix green strength benefits. The instant friction materials differ from those taught by the '300 application in that herein there is employed both a fibrillated fiber and a fiber staple in conjunction with the soluble, organic, synthetic polymer particles. This combination of ingredients has been found to provide unexpectedly superior results with respect to green strength and in many cases, superior physical, frictional/thermal properties.

Related patents which show blends of fibrous materials and polymer particles include U.S. Pat. No. 3,325,345 which is limited to fibrillated cellulosic fibers; U.S. Pat. No. 4,387,178 which requires the presence of a polyacrylic latex; U.S. Pat. No. 4,485,138 which requires the presence of rubber to prepare a vulcanized blend of fibers; U.S. Pat. No. 4,495,030 which includes submicron size glass fiber in a toxic vapor absorptive filter material; U.S. Pat. No. 4,748,075 which teaches a soft gasketing material composed of at least three (3) different fibers, natural fibers, synthetic organic fibers and mineral or metal fibers. No organic, synthetic, soluble polymer particles are added thereto.

U.S. Pat. No. 4,769,274 teaches the production of inexpensive mats using a coarse, cellulosic fiber, thermoplastic synthetic polymer fibrils and non-fibrous, thermoplastic, synthetic polymer particles. The products are used as door panels, interior/exterior partitions, molded doors, etc., when laminated with other disclosed ingredients. No disclosure of friction materials is made.

U.S. Pat. No. 5,190,657 is related to blood filters comprised of specific denier interlocked, textile fibers and certain fibrillated particles of polymeric material as taught in U.S. Pat. No. 4,274,914. The particles are described as not being fibers.

U.S. Pat. No. 5,272,198, by the present inventors, relates to a reinforced material comprised of an elastomeric matrix and a small denier acrylic fiber which may be used in conjunction with other fibers such as glass fibers, polyolefin fibers, polyamide fibers, polyester fibers, polyimide fibers etc. No particles of synthetic, soluble, organic polymer are added.

SUMMARY OF THE INVENTION

The present invention relates to a wet processed friction material comprising from about 1 to about 30 weight percent of a blend comprising:

a) from about 5 to about 75 weight percent of a fibrillated, synthetic, organic polymer fiber;

b) from about 20 to about 90 weight percent of a synthetic, organic polymer staple fiber; and c) from about 5 to about 30 weight percent of synthetic, soluble organic polymer particles.

More particularly, the present invention relates to a friction material comprising from about 1 to about 30 weight percent of a blend wherein at least one of a), b) and c) is an acrylic polymer.

When at least one of a), b), and c) is a high molecular weight acrylic or a preoxidized polymer acrylic there is provided improved physical/thermal properties in the finished friction mix.

A method for the production of a non-asbestos friction material also forms part of this invention wherein a mixture containing a primary binder resin and the above dry blends is prepared and the dough is processed into a friction device.

DESCRIPTION OF THE INVENTION INCLUDING PREFERRED EMBODIMENTS

It has been found that the production of non-asbestos type friction material can be materially enhanced by use of the fiber/particle blends of the present invention. Particularly, the staple fibers and particles, which when used individually are generally not processing aids, significantly contribute to the processability and green strength of wet non-asbestos friction mixes when used together in combination with a fibrillated fiber or fibers. The performance of these synergistic blends as processing aids is unexpectedly superior to fibrillated fiber alone, on an equal pulp content basis, and in many instances, the blends are more effective processing aids than fibrillated fiber alone on an equal weight basis.

Furthermore, the fibrillated fiber/staple fiber/particle blends are capable of being tailored to exact performance requirements especially at lower production cost. The blends impart strength and stiffness to the liners produced therefrom for curing into brake shoes, pads etc. as well as providing improved physical properties and friction/thermal stability as compared to like amounts of the fibrillated fiber alone.

The fibrillated fibers which form the first component of the blends of the instant invention are well known to those skilled in the art and any fibrillated fiber known to be useful in friction materials is useful herein. Specifically, and most preferably, fibrillated acrylic polymer fibers may be employed. These fibrillated fibers preferably have a CSF of below about 600 ml and are preferably formed from a polymer whose melting point is above about 450° F. They have a length ranging from about 2 mm to about 10 mm and a diameter of from about 8 microns to about 50 microns.

Preferred fibers are fibers of polymers having an acrylonitrile content of at least 85% (based on weight of acrylonitrile monomer content to total monomer content of the pre-polymerization mixture). Particularly useful fibers are those of polymers having an acrylonitrile content in excess of about 89%. The preferred comonomers comprise methyl methacrylate or vinyl acetate which are preferably present at levels of approximately 8.5%, by weight, as discussed above.

An even more preferred fibrillated fiber is that produced from a random bicomponent fiber made from a 50/50 mixture of a 90/10 acrylonitrile/methyl methacrylate or vinyl acetate copolymer and a 93/7 acrylonitrile/methyl methacrylate or vinyl acetate copolymer. Other comonomers may be used without limitation provided that their inclusion does not materially detract from the ability of the fiber to be fibrillated nor with the properties of the fibrillated fiber produced. Compatibility of such other monomers can easily be determined by one skilled in the art by simple experimentation. Alternatively, the acrylic fiber can be homopolymer.

Canadian Standard Freeness is measured as is described in a test set forth in an article entitled "Freeness of Pulp"; Tentative Standard 1943; Official Standard 1946; Revised 1958 and Official Test method 1985; Prepared by The Technical Committee of the Tappi Association.

The fibrillated acrylonitrile fibers useful in the instant invention can be made in any known manner such as by using a modified commercial blender. In general, modified Waring brand commercial blenders wherein the as-supplied blade has been modified to provide a break edge of about 0.25 mm on the working edge, may be used. In operation, a relatively dilute slurry of precursor fiber in water is generally introduced into the blender device which is then run for from at least about one-half hour to at least about one hour depending upon the molecular weight and diameter of the fiber being used. The fibrillated fibers are well known to those skilled in the art and can be prepared as is known to them such as described in the patents mentioned above, e.g. U.S. Pat. No. 4,866,107. Additionally, U.S. Pat. No. 4,811,908 teaches such a method, said patents hereby being incorporated herein by reference.

Fibrillated high modulus/high molecular weight acrylic fiber may also be used. By "high molecular weight" is meant a weight average molecular weight of at least about 150,000. The fibrillated fibers useful herein may also contain additives such as cyanoguanidine (DICY), metal salts, N-substituted malimides, etc. to enhance thermal stability.

The fibrillated fibers may also be formed from other polymers and still be useful in the present invention. Thus, aliphatic polyamides, polyesters, polyvinyl alcohols, polyolefins, polyvinyl chlorides, polyvinylidene chlorides, polyurethanes, polyfluorocarbons, phenolics, polybenzimidazoles, polyphenylenetriazoles, polyphenylene sulfides, polyoxadiazoles, polyimides, aromatic polyamides etc. may be used. The aromatic polyamides (aramids) are the second most preferred after the acrylic polymers discussed above, followed by the cellulose acetates, polybenzoxadiazoles, polybenzimidazoles, etc. Aramid polymers such as poly (p-phenylene terphthalamide) and poly (m-phenylene isophthalamide) are exemplary.

Aramids, as used herein, are intended to include wholly aromatic polycarbonamide polymers and copolymers of recurring units of the formula

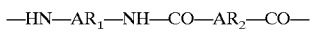

wherein $AR_1$ and $AR_2$, which may be the same or different, represent divalent aromatic groups. Para-aramids refer to para-oriented aromatic polycarbonamides of Formula I, above, wherein $AR_1$ and $AR_2$, which may be the same or different, represent divalent, para-oriented, aromatic groups. By "para-oriented" is meant that the chain extending bonds from aromatic groups are either coaxial or parallel and oppositely directed, for example, substituted or unsubstituted aromatic groups including 1,4-phenylene, 4,4'-biphenylene, 2,6-naphthalene, and 1,5-naphthalene. Substituents on the aromatic groups other than those which are part of the chain extending moieties should be nonreactive and must not adversely affect the characteristics of the polymer for use in the practice of this invention. Examples of suitable substituents are chloro, lower alkyl and methoxy groups. The term para-aramid also encompasses para-aramid copolymers of two or more para-oriented comonomers including minor amounts of comonomers where the acid and amine functions coexist on the same aromatic species, for example, copolymers produced from reactants such as 4-aminobenzoyl chloride hydrochloride, 6-amino-2-naphthoyl chloride hydrochloride, and the like. In addition, para-aramid encompasses copolymers containing minor amounts of comonomers containing aromatic groups which are not para-oriented, such as, for example, m-phenylene and 3,4'-biphenylene. Those taught in WO93/04300, incorporated herein by reference, are exemplary.

The fibrillated fiber components of the blends of the present invention may be crimped or non-crimped.

Preferably the fibrillated acrylic fiber should have a BET surface area of over 5 $M^2/g$, a CSF from 50 to 600, a modulus of 2.75 GPa to 16.5 GPa, a number average molecular weight of 75,000 to 500,000 and a specific gravity of 1.1 to 1.2. BET represents the criteria advanced by S. Brunauer; P. H. Emmett and E. Teller, Journal of American Chemical Society; Vol. 60; page 309; 1938.

The second critical component of the blends useful in the instant invention is a synthetic, organic polymer, staple fiber. Any of the polymers discussed above with respect to the fibrillated fiber component can be utilized to produce the polymer forming the staple fiber component. The preferred staple fiber is one made from an acrylic polymer i.e. acrylonitrile polymer, as discussed above. The staple fiber may also be crimped or non-crimped. It preferably has a length of from about 0.5 mm to about 12 mm, more preferably from about 1.5 mm to about 7 mm. It preferably has a diameter of from about 8 microns to about 50 microns, more preferably about 10 to about 25 microns, a modulus of 2.75 GPa to 85 GPa and a specific gravity of 0.90 to 2.00.

Preferably, the staple fiber is an acrylic staple with a minimum modulus of 2.75 GPa and a minimum weight average molecular weight of 75,000 and a specific gravity of 1.15 to 1.2. The acrylic staple fibers may be either prepared from copolymers or homopolymers as discussed above.

Preferably, the staple fiber for higher temperature and/or structural performance is an acrylic staple fiber having 1) additives to increase thermal stability or 2) high modulus/high molecular weight with a minimum modulus of 5.5 GPa and a minimum weight average molecular weight of 150,000, or 3) been preoxidized to a greater than 30% reduction in its nitrile group content to result in a minimum modulus of 5.5 GPa because of thermal treatment or 4) any combination of 1)–3). These preferred acrylic staple fibers provide improved frictional/thermal stability and/or strength to the friction material produced therefrom.

The fiber staple may have a circular or non-circular cross-section, i.e. may be ribbon fiber, or may be dog bone shaped, S-shaped, C-shaped etc. The staple fiber may be milled, may be in the form of floc, may contain thermal stability enhancing additives, may be slightly to fully preoxidized, may be carbon fiber, or the like.

The third component of the blends of the present invention is a particulate, synthetic, soluble, organic polymer. The particulate component may also be produced from many of the above-discussed polymers from which the fibrillated fiber component is prepared as long as it is soluble. By the term "soluble", as used herein, is meant that the polymer from which the particles are made is soluble in some medium i.e. organic solvent, water, acid etc. and the particle maintains its physical identity after being cured into the ultimate friction device. The particulate may be formed by reaction or by grinding and/or pulverizing larger pieces of polymer.

Again, preferably, the particulate component is produced from an acrylic polymer. The particulate component may be solid or porous and may have an average diameter below about 60 microns. More preferably, the particulate is formed during the polymerization of acrylonitrile by a bulk, emulsion, aqueous-suspension or slurry process which causes a polymer particulate to be precipitated or suspended from drops of monomer or dissolved monomer as discussed in U.S. Pat. No. 2,983,718, German Patent 1,093,990, Brit. Patent 866,445, U.S. Pat. No. 2,691,645 and U.S. Pat. No. 2,963,457. The particulate components preferably have a BET surface area of at least about 1 $m^2/g$ and a specific gravity of from about 1.10 to about 1.20. For higher temperature stability, preferably the particulate acrylic component is preoxidized to a greater than 30% reduction in nitrile group content and to increase its specific gravity to about 1.25 to 1.38.

The friction material processing aid blend used in the present invention comprises from about 5 to about 75 weight percent of the fibrillated fiber, preferably from about 15 to about 50 weight percent; from about 20 to about 90 weight percent of the staple fiber, preferably from about 40 to about 80 weight percent and from about 5 to about 30 weight percent of the particulate soluble polymer, preferably from about 5 to about 15 weight percent, the total weight percent of all three components, of course, being 100%

Preferably at least one of the three components of the blend is an acrylic polymer. More preferably, two components are acrylic polymers and most preferably, every component is an acrylic polymer.

When at least either the staple fiber or the particulate component is an acrylic polymer, the particulate component can be carbonized, but it is preferred that the particulate polymer be non-carbonized.

A separate slurry or dispersion of resin solution containing friction additives and curing agents is prepared and added to mix ingredients in a suitable mixer, for example a Baker Perkins mixer, a Day mixer, or a W & P mixer. A solvent is added to permit a wet plastic coherent mass to be formed under pressure but which has a consistency adapting it for feed by gravity flow to the screw of an extrusion machine or to the working parts of any other apparatus for processing the composition into elements. In general, as solvents for tackifying, equi-volume mixtures of butanol and toluene are used but other combinations of organic solvents, which have a swelling action on the copolymer may also be effective.

The amount of solvent to be added depends upon the formulation of the composition and the purpose for which the end product is to be used. In general, a range from 10% to 25% by weight of solvent based upon the total weight of the dry ingredients is useful. The use of too large an amount of solvent will reduce the green strength of the formed friction element, will increase the time for drying out the formed element, and most importantly, will cause excessive shrinkage of the friction elements during the drying stage. On the other hand, the use of too small an amount of solvent will not sufficiently plasticize and tackify the composition so that easy forming of the friction elements by any of the wet methods hereinafter more fully described, can be carried out. The use of too low an amount of solvent may also result in poorly bonded, easily cracked and non-homogeneous structures. The time of mixing the ingredients will depend upon the specific mix and may vary from 5 to 30 minutes. The mixing is carried out until a homogenous blended mass is obtained. The appearance of the mass may range from that of a damp powder to that of damp rubbery agglomerates of the friction element.

The damp mixed batch of ingredients is removed from the mixer and transferred to a wheel-rolling machine, as discussed above, or fed into a hopper of a single screw extrusion machine where it is picked up by the screw and forced under pressure to the die at the end of the machine. The extrusion die has the proper shape and size of opening (slightly oversize to allow for shrinkage) to provide the required width and thickness of the friction element desired. Depending upon the formulation, the die may be either heated or cooled. A heated die is preferably used for materials containing a low solvent content or where the mix is very viscous. On the other hand, a cooled die is preferably used for making friction elements where the mass has sufficient plasticity to flow easily. The rate of extrusion is so controlled that a homogenous continuous strip of friction element of maximum density is formed. The speed of extrusion is dependent upon the mix and may vary from 5 feet per minute to 60 feet per minute. The strips of green friction element material are preferably cut off as extruded to give the desired length of friction element, and these are preferably placed in a steam heated oven to evaporated the extrusion solvents and plasticizers.

While the elements of this invention are best formed as aforesaid, it will be understood that they may be produced by any of the several conventional techniques known in the art. For example, in producing linings, the damp mix may be extruded through a ram extruder or a modifier screw extruder such as the Baker Perkins "Ko=kneeder." Moreover, the friction elements may be formed using the same mix described above on a profile-calendar machine, sometimes referred to as a wire-back machine or roll-extruder. By employing a larger amount of solvent in the mix, the lining mix may be handled on a so-called sheeter machine, whereby a continuous sheet of friction element material is built up on a hot roll while being compressed by a counter-rotating cold roll.

After forming the friction elements to the approximate dimensions required therefor, solvents and plasticizing agents are then preferably removed. The length of the dry out period will depend upon the amount of solvent and plasticizers present in the mix, the thickness of the friction element, the dry out temperature, and whether or not a reduced pressure is employed to accelerate removal of solvent from the element. In practice, times of 12 to 48 hours at temperatures of 120° F. to 150° F., are satisfactory for sections of most friction elements. These drying periods of course being possible of reduction where higher temperatures of drying are employed.

Following drying and before the friction elements are cured, densification of the friction composition is preferably carried out. This is effected, for example, by pressing the flat elements between heated platens in a hydraulic press. The pressures are not critical, such being from a few pounds up to 2,000 pounds per square inch. However unit pressures in order of 500 to 1,000 pounds per square inch at a temperature in the range of 250° F. to 320° F. are found satisfactory. The dwell time in the press is also not critical and can range from two to ten minutes depending upon the thickness of the friction element and the specific temperature chosen for the densification process. The dwell time in a pressure activated mechanism may be reduced to a matter of a few seconds if a separate preheating step to soften the binder is used. In this densification procedure, the elements are preferably densified to within a range of 75% to 95% of theoretical density.

Following, densification, the friction elements, while still hot or following cooling to room temperature, are formed to produced a curved segment having substantially the same radius of curvature as the radius of the brake drum or other device with which the friction element is to be used. Of course, if the elements are to be employed in flat condition, such forming is not necessary. The shaping process may be performed manually by forming the elements over a drum or cylinder of correct radius, or by machine feeding the friction elements over a drum while exerting pressure on the friction element. This forming or curing step is not critical in the manufacture of brake linings but permits more rapid loading of the curing forms subsequently used for the final step.

The friction elements may if desired, be densified and curved simultaneously by the concurrent application of heat and pressure while the dry friction elements are held in a curved mold of correct accurate dimensions.

The substantially solvent-free densified formed friction elements are preferably cured at elevated temperatures for extended period of time. The exact time and temperature of cure will obviously depend largely upon the particular formulation chosen and upon the desired end properties of hardness and coefficient of friction to be desired. In general, onemay use a range of 350° F. to 600° for periods of time from 1 to 36 hours, the shorter periods of time and lower temperatures of cure yielding softer friction elements which possess improved effectiveness and reduced tendency to produce noise in use. Although it is preferred that the elements of this invention be cured, it may be pointed out that friction elements may be made without employing any cure at all.

The desired hardness of the friction element can be controlled to some extent by the proper selection of time and temperature, a higher temperature of cure requiring a shorter curing time and a lower temperature of cure requiring a longer curing time.

When the friction elements are to be used in connection with drum brakes, assembly of the friction element to the brake shoe will be facilitated by curing the lining in a curved form so that the inside radius matches that of the shoe. For this purpose, any conventional curing from such as a rigid drum or pipe to form the inside radius may be employed. Pressure may be applied to the outer surface of the uncured element by the use of a tightened or spring-held flexible metal strip. In order to attain high rates of production, a multiple curing jig known as a "lunette" may be used wherein a nesting group of crescent-shaped perforated metal assemblies are used to hold twenty or more pieces of friction element material at one time. A sandwich construction is built up consisting of a crescent-shaped metal part, a piece of lining, another crescent-shaped part, another lining, et, until the pack has reached a sufficient height. A rigid frame is then placed around the pack and pressure built up by tightening a threaded bolt in the frame.

In curing the green friction elements, the assembled packs thereof are preferably placed in an oven provided with suitable means for inducing high temperatures in such chamber. Mechanical convection of air is preferably provided to maintain uniform temperatures within the pack of liners and to prevent overcure, burning, or non uniform cure of the elements. The friction elements may be placed directly into a hot oven. It is usually preferred however that the friction elements be placed in a cold oven and a long steady increase of temperature up to the desired cure temperature be provided. Such procedure avoids the formation of blisters, gas pockets, and fissures in the friction elements caused by the rapid evolution of gaseous material. Consequently, uniformity of cure throughout the pack is thereby facilitated.

Another method of curing which may be used in place of the batch process of oven curing is to employ a continuous belt or chain passing through an oven having progressively higher temperature zones so that the usual time/temperature relationships are satisfied. In all cases, whether by batch curing or belt curing, curing of the friction element in the maximum temperature zone for at least one hour is acceptable.

The cured shaped elements or segments of friction material after cooling and removal from the oven or other curing chamber are processed in the conventional manner by cutting or grinding to shape and by grinding the surfaces of the friction elements.

Although we have specifically described the making and curing of friction elements particularly adapted for friction lining application, it will be understood that the novel compositions of this invention are suitable for many other applications such as clutch facings, friction facings for disc brakes, clutch and brake bands for automatic transmissions and the like.

Another technique useful in producing the friction materials of the instant invention is the so-called "slurry technique" wherein the blend of fibrillated fiber-fiber staple-soluble polymer particle, binder resin and other ingredients is dispersed in water by means of a beater to form a pulp. The pulp is formed into a sheet by deposition on a wire screen or felt and the water sucked out. The sheet is then dried, cut into desired shapes and cured by application of heat and pressure.

The binder component of the friction material of the present invention can be any thermosetting resin known to those skilled in the art to be useful for this purpose. Exemplary resins include phenol-aldehyde resins; oil-modified phenol-aldehyde resins; silicone resins; urea-formaldehyde resins; melamine-formaldehyde resins, epoxy resins; liquid hydroxyl-terminated butaldiene copolymer resins; linseed oil resins; cashew based resins; and the like. Drying oil may also be used. Blends of the above resins with vulcanizable rubber such as butadiene-styrene rubbers; butadiene-acrylonitrile rubbers; can also be used, preferably in combination with a vulcanizing agent such as sulfur.

Other additives of the friction materials of this invention include steel wool, bronze fiber, glass fiber, wollastonite, cellulose fiber, zinc oxide, barytes, zinc dust, graphite, iron oxide, polymerized cashew nut shell oil; carbondum etc.

Typical formations are as follows:

|  | Weight Percent | |
| --- | --- | --- |
| Constituent | Broad | Preferred |
| Composition Type A non-metallic | | |
| Copolymer binder | 10–60 | 10–25 |
| Peroxide catalyst | 0.1–10 | 0.1–5 |
| Inorganic Fibers | 20–70 | 30–60 |
| Cellulose fibers (wood) | 5–25 | 10–20 |
| Coke (--200 mesh) | 0–15 | 1–8 |
| Graphite (-40 mesh) | 0–10 | 1–7 |
| Pigment (--200 mesh carbon black) | 0–15 | 1–8 |
| Composition Type B semi-metallic | | |
| Copolymer binder | 2–50 | 2–10 |
| Peroxide catalyst | 0.02–12.5 | 0.04–1 |
| Metal fibers or powder (steel wool)* | 15–75 | 55–75 |
| Graphite (--40 mesh) | 5–50 | 15–30 |

*Preferably 2:1 to 3:1 powder fibers

The matrix blend constitutes from about 1.0 to about 30% of the friction materials of the present invention with the remaining amounts being well known friction components including such other components such as discussed above.

The individual fiber-particle blend components of the instant invention may be effectively introduced into the friction material separately, however, it is preferred that all the components be preblended prior to introduction into the lining dough mixer or preblended in the mixer prior to the introduction of other components. During mixing, the fibrillated fibers, via their tentacle-like projections, catch the staple fibers and particulate polymer so as to evenly distribute them and prevent excessive bulk. The components of the instant invention can be premixed, either in a wet or dry state, using techniques known to those skilled in the art. For example, each component can be mixed as a wet slurry in a hydropulper, a beater, a disc refiner or other types of equipment known to those skilled in the art and then dewatered on a paper machine or belt press to about 30–60% solids. Suitable cationic and/or anionic retention aids may be used to retain particulate polymer and fiber staple in the fibrillated fiber. Additionally, the particulate polymer and/or staple fiber can be blended with the wet fibrillated fiber, which is at a 30–60% solids content, during drying and fluffing in equipment such as a Rennelburg rotary dryer. All or some components may also be blended in a dry or partially dry state using a Littleford mixer, a Wrassmann processor, rotary dryer, Fitzmill, or other similar mixing equipment known to those skilled in the art. As mentioned above, the fibrillated fiber-fiber staple-particulate polymer blend may constitute from about 1 to about 30 weight percent, of the friction material, preferably from about 5 to about 25 weight percent.

The following examples are set forth for purposes of illustration only and are not to be construed as limitations on the present invention except as set forth in the appended claims. All parts are by weight unless otherwise specified.

| Formulation A: | | |
|---|---|---|
| | V % | WT % |
| BINDER | | |
| COLLOID 5466 Cashew resin (80% solids) | 30.8 | 16.3 |
| HEXA | 3.1 | 1.6 |
| Nitrile Rubber + CURE AGENTS | 6.2 | 3.0 |
| FIBERS | | |
| STEEL FIBER | 2.1 | 8.1 |
| BASALT (R-4164) | 14.4 | 21.0 |
| WOLLASTOKUP | 8.2 | 11.6 |
| CARBONS | | |
| SEA COAL (WE33) | 6.2 | 5.1 |
| S-5514 GRAPHITE | 10.3 | 11.1 |
| ORGANICS | 7.3 | 3.9 |
| Cashew particle (NC 108-20) | | |
| INORGANICS | | |
| BARYTES | 5.2 | 11.2 |
| VERMICULITE (FPXV) | 6.2 | 7.1 |

EXAMPLES 1–23

MIXING PROCEDURE:

1. Add dry powders and fibrillated fiber-fiber staple-soluble polymer particulate blend and blend for 10 minutes with plows and choppers.

2A. Add the preheated (60–70° C.) resin over 7–9 minutes while mixing with plows and choppers.

OR

2B. After preblending the other dry components (#1 above) for 9 minutes, add the fibrillated fiber-fiber staple-soluble polymer particulate blend and mix one minute. Then add resin over 7–9 minutes and continue mixing to the end point.

MIX PROCESSING

After discharge from, the mixer, raw mixes are stored for 2–4 days under refrigeration in sealed bags to prevent resin advancement, solvent loss and moisture absorption. Just prior to rolling trials, batches are remixed in the mixer for 2 minutes to warm and loosen compacter material.

ROLLING TRIALS

Batches are processed through an rolling machine to obtain test samples. Due to the resin and volatile level of the formulation, rolling trials are run at 150–180 cm (5–6 ft)/min for a 50 mm (2") wide tape at 4 mm (0.155") thickness. The mix flows well through the feed system and tape quality is good with no indication of fiber clumps, discreet pellets or sruface cracks. In each instance, excellent friction material is produced.

| POWDER DESCRIPTIONS | | | |
|---|---|---|---|
| Powder Designation | Polymer Type | Average Particle Diameter, Micron | Surface Area, $M^2/g$ |
| A | acrylic | 50 | 8 |
| B | acrylic | 20 | 12 |
| C | acrylic | 30 | 9 |
| D | acrylic | 20 | 10–12 |
| E | polyetherimide | 50–100 | <2 |
| F | polyamideimide | 5 | <2 |
| G | acrylic | 15 | 10–12 |
| H | acrylic | 50 | 8 |

| STAPLE DESCRIPTIONS | | | | | | | |
|---|---|---|---|---|---|---|---|
| Staple Designation | Chemical Description | Denier, g/9000 m | Diameter. Microns | Length (in.) | Modulus MSI | Crimp | Tenacity g/den |
| A | Acrylic | 1.1 | 13 | .25 | 0.75 | Yes | 3.0 |
| B | Acrylic | 0.8 | 10 | .25 | 0.5 | Yes | 2.5 |
| C | Acrylic | 0.8 | 10 | .50 | 0.5 | Yes | 2.5 |
| D | Acrylic | 5.4 | 23 | .25 | 0.8 | Yes | 3.0 |
| E | Acrylic | 3.0 | 18 | .25 | 0.5 | No | 2.5 |
| F | Acrylic | 16.0 | 40 | .25 | 0.5 | Yes | 2.0 |
| G | Acrylic | 5 | 22 | .25 | 0.5 | No | 2.5 |
| H | Acrylic | 1.5 | 13 | .25 | 2.0 | No | 5.0 |
| I | Pre-ox | 1.5 | 12.5 | .25 | 1.1 | No | 2.6 |
| J | Pre-ox | 1.5 | 12.5 | .125 | 1.3 | No | 2.6 |
| K | Aramid | 1.5 | 12 | .25 | 8 | No | 15.30 |
| L | Novoloid | 2 | 15 | .25 | 0.5 | No | 1.0 |
| M | Cellulose | N.A. | 30–40 | .16 | 0.8 | No | 5.0 |
| N | Cotton | N.A. | 25 | .10 | 0.8 | No | 5.0 |
| O | Acrylic | 0.8 | 10 | .04 | .5 | Yes | 2.5 |
| P | Acrylic | 1.1 | 13 | .02–.10 | .75 | Yes | 3.0 |
| Q | Acrylic | 5 | — | 0.2–.10 | .5 | No | 2.5 |

FIBRILLATED FIBER/PULP DESCRIPTIONS

| Fibrilated Fiber Designation | Commercial Designation | CSF | Surface Area $M^2/g$ | Average Fiber Length, In. | Maximum Fiber Length, In. |
|---|---|---|---|---|---|
| A | CFF V110-1 | 250 | 50 | .25 | .30 |
| B | (110-1) | 180 | 50 | .25 | .30 |
| C | (110-1) | 430 | 50 | .28 | .32 |
| D | acrylic | 600 | 10 | .22 | .28 |
| E | aramid | 425 | 10 | .20 | .36 |
| F | polypropylene | — | | .28 | .31 |
| G | cellulose acetate | — | | .26 | .40 |

TABLE 1

| Example No. | Formulation | Fib. Fiber-% | Staple-% | Powder-% |
|---|---|---|---|---|
| 1 | A | A-60 | A-30 | A-10 |
| 2 | A | D-60 | A-10 | A-20 |
| 3 | A | E-60 | K-25 | H-10 |
| 4 | A | A-50 | A-20 | E-20 |
| 5 | A | A-40 | A-30 | F-15 |
| 6 | A | A-5 | A-70 | G-30 |
| 7 | A | A-10 | A-75 | A-30 |
| 8 | A | E-15 | H-60 | H-25 |
| 9 | A | A-20 | B-60 | A-15 |
| 10 | A | A-25 | C-55 | A-25 |
| 11 | A | A-30 | D-50 | D-20 |
| 12 | A | A-35 | E-45 | A-20 |
| 13 | A | A-40 | F-40 | A-20 |
| 14 | A | A-45 | G-35 | A-20 |
| 15 | A | F-45 | M-25 | B-30 |
| 16 | A | A-45 | N-25 | C-30 |
| 17 | A | G-35 | L-45 | B-20 |
| 18 | A | B-70 | A-25 | B-5 |
| 19 | A | C-70 | O-25 | B-5 |
| 20 | A | A-70 | P-25 | D-5 |
| 21 | A | A-40 | Q-55 | B-5 |
| 22 | A | A-40 | I-50 | B-10 |
| 23 | A | A-35 | J-50 | B-15 |

EXAMPLE 24

The procedure of Example 1 is again followed except that the fibrillated fiber, the staple fiber and the powder are all produced from aramid polymer. Similar results are achieved.

EXAMPLE 25

The procedure of Example 1 is again followed except that the powder is produced from aramid polymer. Similar results are obtained.

EXAMPLE 26

The procedure of Example 1 is again followed except that both the staple fiber and the powder are produced from aramid polymer. Again, the results are similar.

We claim:

1. A wet process friction material comprising from about 1 to about 30 weight percent of a blend and from about 70 to about 99 weight percent of other friction material components, said blend comprising:

a) from about 5 to about 75 weight percent of a fibrillated, synthetic, organic polymer fiber;

b) from about 20 to about 90 weight percent of a synthetic, organic polymer staple fiber and c) from about 5 to about 30 weight percent of soluble, synthetic, organic polymer particles wherein the organic polymer particles are soluble in organic solvent, water or acid.

2. A friction material according to claim 1 wherein at least one of a), b), and c) is an acrylic polymer.

3. A friction material according to claim 1 wherein each of a), b) and c) is an acrylic polymer.

4. A friction material according to claim 2 wherein said acrylic polymer is an acrylonitrile polymer.

5. A friction material according to claim 3 wherein said acrylic polymer is an acrylonitrile polymer.

6. A friction material according to claim 1 wherein the average diameter of c) is below about 60 microns.

7. A friction material according to claim 1 wherein the canadian standard Freeness of a) is below about 600 ml.

8. A friction material according to claim 1 wherein c) has a Brunauer-Emmett-Teller surface area greater than 1 $m^2/g$.

9. A friction material according to claim 1 wherein b) has a length of from about 0.5 to 7 mm.

10. A friction material according to claim 1 wherein either or both of a) and/or b) are crimped.

11. A friction material according to claim 1 wherein either or both of b) and/or c) are pre-oxidized.

12. A friction material according to claim 1 wherein the concentration of a) is from about 15 to about 50 weight percent, the concentration of b) is from about 40 to about 15 weight percent and the concentration of c) is from about 5 to about 15 weight percent.

13. A friction material according to claim 1 further comprising a thermosetting binder.

14. A friction material according to claim 1 wherein a) and/or b) is a bicomponent fiber.

\* \* \* \* \*